March 17, 1942.  G. G. HARRINGTON  2,276,620
VALVE
Filed Dec. 26, 1939    2 Sheets-Sheet 1
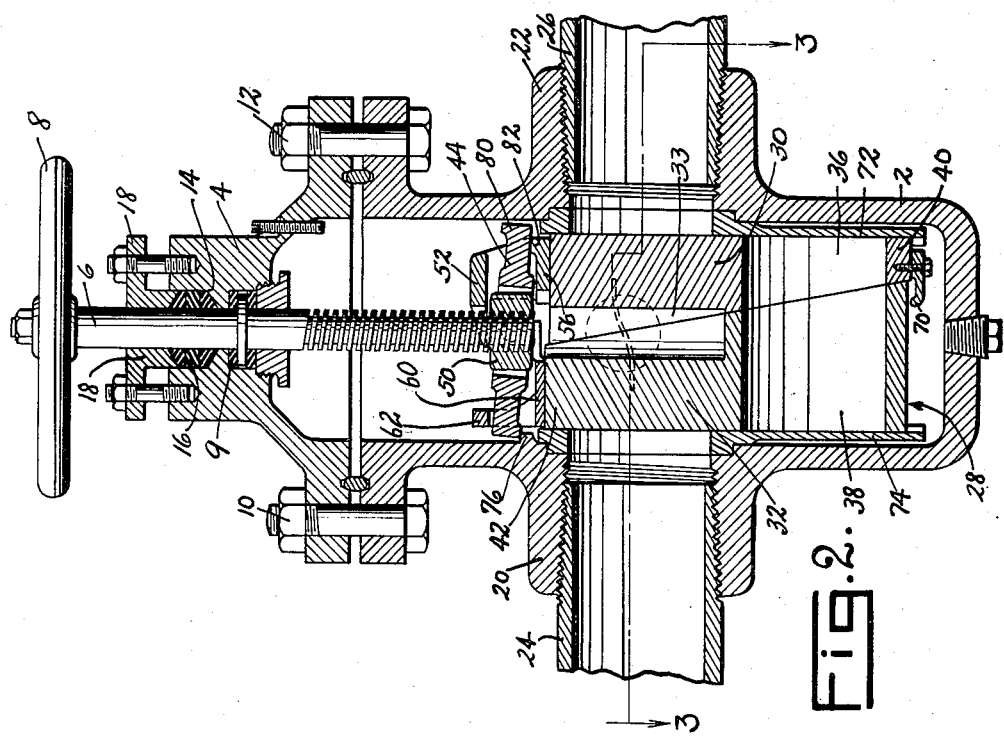
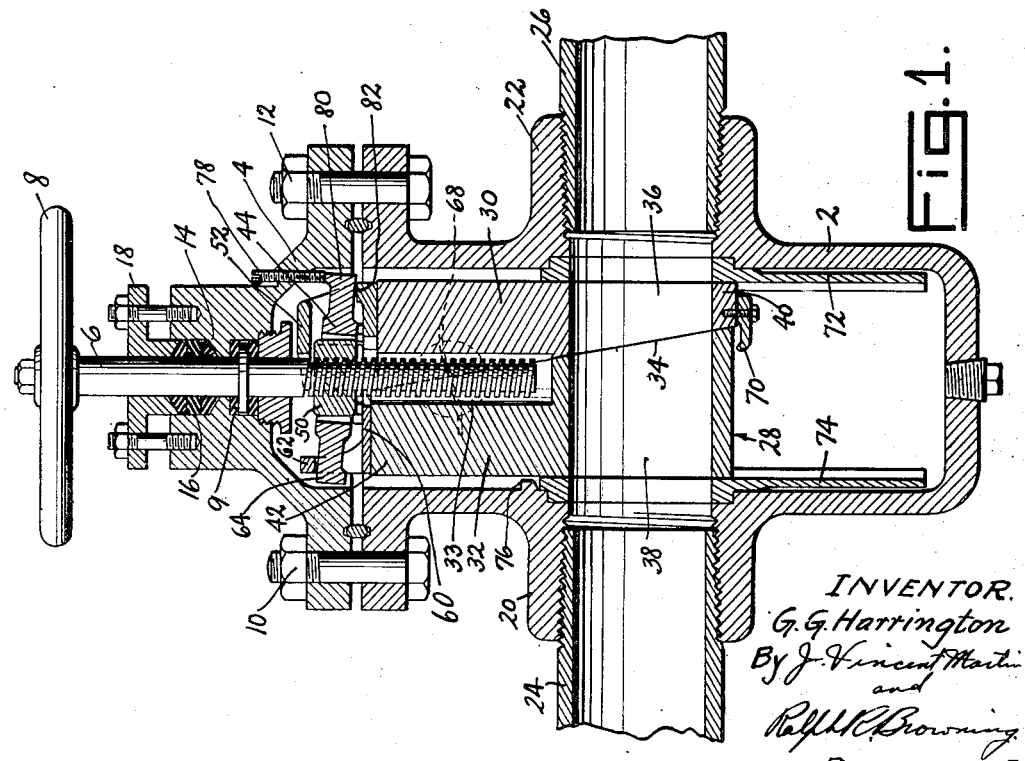
INVENTOR.
G. G. Harrington
By J. Vincent Martin
and
Ralph R. Browning
ATTORNEYS

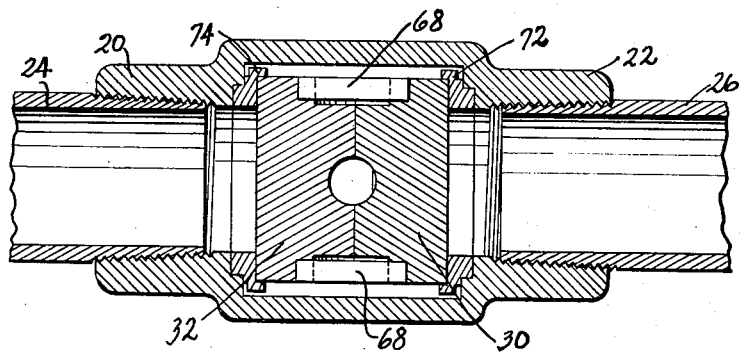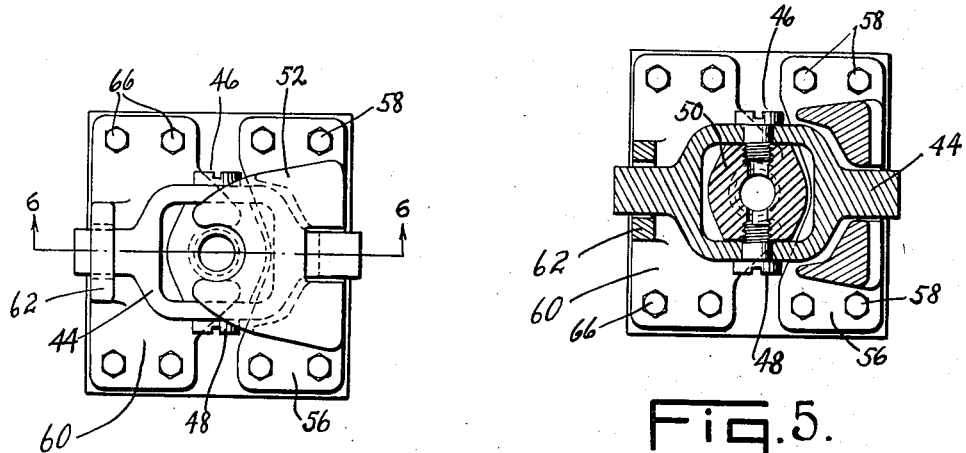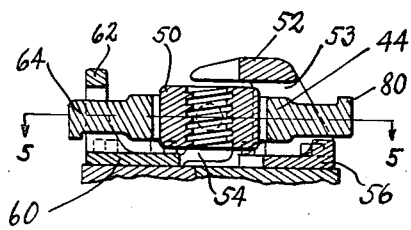

Patented Mar. 17, 1942

2,276,620

UNITED STATES PATENT OFFICE 2,276,620

VALVE

George G. Harrington, Houston, Tex., assignor to Reed Roller Bit Company, Houston, Tex., a corporation of Texas Application December 26, 1939, Serial No. 310,893

12 Claims. (Cl. 251—68)

The present invention relates to a gate valve and more particularly to a gate valve of a sliding wedge design adapted to tightly close the valve to prevent leakage and which may readily be operated to open the valve.

One of the objects of this invention is to provide a form of gate valve of sliding wedge type in which the wedges will be tight in either the open or the closed position of the valve.

Another object of the invention is to provide a form of gate valve of the sliding wedge type in which the wedges may be easily loosened from the tightened position in either the open or closed position and readily moved from one position to another regardless of the pressure of fluid on the valve or the direction of flow of the fluid through the valve.

Another object of the invention is to provide a form of gate valve of the type referred to having a uniform flow opening.

Another object of the invention is to provide a form of gate valve in which the gate or valve portion is made up of sections which engage each other at an angle to their direction of movement, along an inclined surface and in which the sections may be operated independently to a slight extent so as to move relatively to each other to cause spreading action laterally thereof in the seating or closing of the valve and to cause lateral contraction, in the opening of the valve so as to loosen one section prior to movement of the gate as a whole.

Another object of the invention is to provide a gate valve of the form referred to having a form of operating mechanism for the initial movement of a section of the gate which is positive in action, not subject to sticking of parts, and which will not be affected in operation by corrosion of parts of the mechanism.

With these and other objects in view, the invention comprises various features and combinations hereinafter more fully described and defined in the annexed claims.

The invention is illustrated in the accompanying drawings, showing a preferred embodiment of the invention, in which:

Fig. 1 is a sectional view in elevation of a gate valve embodying the invention, in which the gate valve is shown in the open position;

Fig. 2 is a sectional view in elevation of the gate valve shown in Fig. 1, in which the valve is shown in the closed position;

Fig. 3 is a sectional view of the device taken on the section line 3—3 of Fig. 2;

Fig. 4 is a detailed top plan view showing the operating means by which initial movement of the wedge members is effected;

Fig. 5 is a detailed sectional view of the parts shown in Fig. 4, taken on the section line 5—5 of Fig. 6;

Fig. 6 is a detailed sectional view in elevation taken on the section line 6—6 of Fig. 4.

Referring more in detail to the drawings, the numeral 2 designates the body portion of a gate valve having the usual or conventional bonnet 4, and the gate operating screw 6, preferably a left hand thread, operated by the usual hand wheel 8, as indicated in the drawings. This screw is held against longitudinal movement by the thrust bearing 9.

The bonnet 4 may be connected to the valve body 2 in the usual way, as by bolts 10 and 12, and may be provided with a stuffing box 14 having the usual packing 16 and gland member or follower 18.

The valve body 2 is provided with the usual threaded connections 20 and 22 in which pipes 24 and 26 may be connected, as indicated, for the admission and exit of fluid to and from the valve.

The gate member 28 for opening and closing the valve comprises wedge members 30 and 32 having a common cylindrical opening 33 into which the screw member 6 passes during the opening movement of the gate member from the closed position.

The wedge members are preferably substantially trapezoidal in form in vertical section, as will be apparent by reference to Figs. 1 and 3 of the drawings, the shorter parallel sides 40 and 42 of the sections or trapezoids being disposed on opposite sides or faces of the gate member, the wedge members having abutting surfaces in oblique alignment; or, in other words, the wedge members engage along an inclined surface 34 so that by a slight relative movement along the said inclined surface a corresponding slight lateral movement of the wedges takes place, by which a wedging action or release from the wedged position of the gate member takes place.

The wedge member 30 has an opening 36 in the lower part thereof and the wedge member 32 has a corresponding opening 38 in the lower part thereof which register in the open position of the valve to permit passage of fluid from the pipe 24 to the pipe 26 or vice versa, depending on the direction of flow of the fluid.

It will be apparent that by the relative movement of the wedge members 30 and 32 in the direction of their smaller ends 40 and 42, a tightening or lateral expansion of the wedge members takes place so as to produce a tight fit of the wedge members against the valve seats or guides 72 and 74 whether in the open or closed position thereof.

In order to operate the wedge members in the manner above described, a lever or toggle member 44 is provided which is pivotally mounted by means of screw members 46 and 48, shown in Fig. 5 of the drawings, in connection with a nut 50 which serves to engage fingers or wedge lifting means 52, connected to the wedge member 30, in the upward movement of the nut, and to engage fingers or wedge operating means 54, operatively connected to the wedge member 32, in the downward movement of the nut, as will be clear by reference to Fig. 6 of the drawings.

The wedge operating fingers 52 are preferably mounted on or attached to a plate 56, which may be attached to the wedge member 30 by means of bolts 58, shown more particularly in Figs. 4 and 5 of the drawings, the fingers being mounted in the form of a bracket having branches extending upwardly so as to leave a central opening or space for the screw member 6 and an open space 53 for the movement of the corresponding end 80 of the toggle member 44.

The fingers or wedge operating means 54 by which the wedge member 32 is operated in the downward movement of the nut 50, comprises a plate member 60 to which the fingers 54 are connected, extending inwardly under the nut so as to engage the lower surface thereof in the downward movement of the nut member. Connected to the plate member 60 is an upstanding stop member 62, which is so positioned with respect to the end portion 64 of the toggle member 44 as to engage the same when the toggle member is rotated in a clockwise direction. The plate member 60 may be attached to the wedge member 32 in any suitable manner, as by means of bolts 66, as indicated in Fig. 4 of the drawings.

In order to provide for following movement of the other wedge member, after one wedge member has been initially operated, I preferably provide a spring member 68 interconnecting the wedge members 30 and 32, as shown more particularly in Figs. 1 and 2 of the drawings.

A stop member 70, which is connected to the lower side of the wedge member 30, is also provided so as to cooperate with the spring member 68 in the event that the wedge member 32 does not move off its seat by the action of the spring member. The stop member 70 is so positioned with respect to the lower portion of the wedge member 32 as to engage the same, causing this wedge to move, thus being forced to follow the movement of the wedge member 30 when this wedge is moved upwardly in opening the valve.

In order to provide a tight seal in the open and closed positions of the valve or gate 28, a seat or guide member 72 is provided adjacent the threaded connection 22, and a seat member or guide 74 is provided adjacent the threaded connection 24, on which the corresponding wedge members 30 and 32 may slide in the opening and closing movements of the gate sections. These also serve to assist in forming a tight seal.

A stop member 76 may be provided immediately above the guide member 74 and so positioned as to engage the corresponding end 64 of the toggle member 44 to stop said end 64 as the nut 50 is moved downwardly in closing the valve, thereby causing movement of the toggle in a clockwise direction to cause seating action of the wedge member 30, as hereinafter described.

A stop member 78 is also provided above the upper surface of the wedge member 30 to stop upward movement of the end 80 of the toggle member and cause rotary movement of said toggle member 44 in a clockwise direction when the corresponding end 80 of the toggle engages the stop member 78.

The operation of the gate valve may now be described as follows:

Assuming that the gate valve 28 is in the closed position, as indicated in Fig. 2 of the drawings, the hand wheel 8 is operated so that the screw 6 is rotated to the left, or in a counter-clockwise direction, by which the nut member 50 is moved upwardly to engage the fingers or wedge operating means 52, by which the wedge member 30 is pulled upwardly, thus loosening it from its seat. After the initial movement of the wedge member 30, the spring member 68 is flexed and thereby produces a corresponding upward thrust on the wedge member 32. As above explained, if the wedge member 32 does not move away from its seat by the action of the spring member 68, then the stop member 70 engages the lower end of the wedge member 32 and forces it to move upwardly away from its seat.

When the gate assembly approaches the open position of the valve, as indicated in Fig. 1 of the drawings, the end 80 of toggle member 44 strikes the lower end of the adjustable stop member 78, causing the toggle member to rotate in a clockwise direction around the pivots 46, 48, as the nut member 50 continues to rise. By this movement of the toggle member, the opposite end 64 thereof moves upwardly approximately twice as rapidly as the movement of the nut member and that of the wedge member 30. In this rotary movement, the end 64 of the toggle engages the stop member 62, forcing the wedge member 32 upwardly at a more rapid rate than that of the wedge member 30, by which the wedge member 32 in its final movement catches up with the wedge member 30 and causes a lateral spreading or wedging action between the gate sections or wedge members which serves to tighten the whole assembly in the open position of the valve.

When the screw member 6 is rotated to the right, or in a clockwise direction, so as to move the valve into closed position, the nut member 50 moves downwardly into engagement with the fingers 54, which are connected to the wedge member 32, causing downward movement of the wedge member 32 and a loosening of the assembly by the slight lateral displacement causing contracting in the width or space occupied by the wedge members. The wedge members are then caused to move downwardly together by the action of the spring member 68 and the stop member 70 until the parts substantially reach the closed position as indicated in Fig. 2 of the drawings. When the assembly approximately reaches the closed position, the end portion 64 of the toggle member 44 engages the stop member 76, rotating the toggle member in a clockwise direction, the end 80 of the toggle member engaging the surface 82 and moving the wedge member 30 downwardly at a speed relatively twice as great as that of the wedge member 32 by which the wedge member 30 catches up in its movement with the wedge member 32 causing a spreading or wedging action, thus producing a tightening of the gate in the closed position of the valve.

If, on movement of the parts toward open position the member 30 tends to keep moving as fast as the member 32 after the part 80 engages the stop 78, because of friction between these parts or for other reasons, such movement will be quickly halted by contact of the abutment 82 on member 30 with the under side of the toggle. The part 30 will thus be held against substantial movement while the part 32 moves with respect thereto into wedging engagement.

Likewise, on closing movement, if the part 32 tends to continue moving with the part 30 after the toggle end 64 contacts the stop 76, the member 62 will engage the upper surface of the toggle and substantially halt such movement while the part 30 continues to move into wedging engagement.

It will be understood that the details of construction of the device as described may be modified as will be apparent to those skilled in the art, without departing from the spirit or scope of the invention as defined in the claims.

I claim:

1. A gate valve of the kind described, having a body member, inlet and outlet openings in said body member, a gate member having two wedge sections contacting on an inclined surface, operating means for applying initial force to either one or the other only of said wedge sections in accordance with the opening or closing movement of said gate valve for initiating the positive movement of one of said wedge sections in advance of the other, means for advancing the said wedge sections, one in advance of the other, through the main portion of the opening or closing movement of the gate member and means operative at substantially the end of the opening or closing movement of said gate member to accelerate the movement of the following wedge section while continuing movement of the leading section to provide a wedging action by the said following wedge section in the final movement of the gate member into open or closed position.

2. A gate valve of the kind described having a body member, inlet and outlet openings in said body member, a gate member composed of two wedge members, vertical sections of which are substantially in the form of trapezoids with the shorter parallel sides oppositely disposed, the said wedge members contacting along a common oblique surface, operating means connected to said wedge members for applying initial force to either one or the other only of said wedge sections in accordance with the opening or closing movement of said gate valve for initiating the positive movement of one of said wedge sections in advance of the other, and means for moving the last operated wedge member into place in the direction of its shorter parallel side by a wedging action in which the relative speed of movement as compared with that of the other wedge member is increased in the final movement of the valve gate into position.

3. A gate valve of the kind described comprising a body member, a gate member composed of a plurality of sections having abutting surfaces in oblique alignment to each other, means for applying initial force to either one or the other only of said wedge sections in accordance with the opening or closing movement of said gate valve for initiating the positive movement of one of said wedge sections in advance of the other, interconnecting means between said sections to cause following movement of the other section after the first section is operated, and means to cause operation of said other section near the limit of travel thereof to increase the rate of movement of said other section while the first section is still in motion so as to catch up in its movement with the other section before the final seating of the wedge section takes place, thus producing wedging action by movement along said oblique abutting surface in the final movement of the valve gate sections into position.

4. A gate valve of the kind described comprising a body member, a gate member composed of a plurality of trapezoidal wedge sections having abutting surfaces in oblique alignment, the shorter parallel sides of the wedge sections being oppositely disposed, means for applying initial force to either one or the other only of said wedge sections in accordance with the opening or closing movement of said gate valve to release the wedging action prior to movement of the gate members from one position to another, interconnecting means between said sections to cause movement together of the said wedge sections through the main path of movement of the gate member from one position to another after the first section is operated, and accelerating operating means to cause increased rate of movement of the following wedge section near the limit of travel of the wedge sections while continuing movement of the leading section to provide wedging action in the final seating movement.

5. A gate valve of the kind described comprising a body member, a gate member composed of two wedge sections in oblique alignment to each other, means for applying initial force to either one or the other only of said wedge sections in accordance with the opening or closing movement of said gate valve to unseat or release the gate member from the open or closed position, interconnecting means between said sections to cause associated movement of the sections after the initial movement of said first section, and lever means for accelerating the advance of the following section relative to the movement of said first section to provide wedging action between said sections during the final movement of said gate member into seating position.

6. A gate valve of the kind described having a body member, inlet and outlet openings in said body member, a gate member having two wedge sections, each of said wedge sections having a large and small end connected by and inclined surface, the said ends being disposed at opposite seating sides of the wedge sections in the open and closed positions of the valve, the wedge sections being so placed relative to each other that the side portions are in contact along said inclined surface, means for applying initial force to either one or the other only of said wedge sections in accordance with the opening or closing movement of said gate valve and for operating one of said wedge sections in advance of the other in movement from the open or closed position of the valve, and means for causing operation of the operating means to move the following wedge section faster than the movement of the leading wedge section during the final seating movement and after the leading section has nearly reached the final seating position.

7. A gate valve of the kind described comprising a body member, a gate member composed of a plurality of sections having abutting surfaces in oblique alignment to each other, means for operating one of said sections in advance of the other section, comprising a screw member, a nut member mounted on said screw member, a lever member pivotally connected to said nut member, means connected to one of said sections for engaging the nut member on one side thereof, means connected to the other of said sections for engaging the said nut member on the other side thereof, means connected to one of said sections for engaging the adjacent end of said lever member and having sufficient clearance to permit a limited movement of said adjacent end of the lever member prior to operation of the other section to cause seating of both sections, and stop means positioned for engagement with the opposite end of said lever member to cause seating of the section having said lever engaging means thereon in the direction of the smaller end thereof after the other of said sections has been moved substantially into seating position.

8. A gate valve of the kind described comprising a body member, a gate member composed of two wedge sections having abutting surfaces in oblique alignment to each other, the larger and smaller ends of the wedge sections being oppositely disposed so that the faces in the direction of movement of the gate member each comprises a large and small end of a wedge section, means for operating one of said sections in advance of the other section comprising a screw member, a nut member mounted on said screw member, a lever member pivotally connected to said nut member, means connected to one of said sections for engaging the nut member on one side thereof to unseat the said wedge section in one direction of movement of the gate member, means connected to the other of said sections for engaging the said nut member on the other side thereof to unseat said other section in the opposite direction of movement of the said gate member, means connected to each section for engaging the end of the lever member adjacent thereto and each such means having sufficient clearance to permit a limited movement of said adjacent end of the lever member without operation of the said other section to cause seating of both sections and means for operating the lever member at predetermined positions in the path of movement of the gate member to cause seating of each of said sections in the direction of the smaller ends thereof after the other of said sections has been moved in advance into substantially the seating position thereof.

9. A gate valve of the kind described comprising a body member, a gate member composed of two sections in oblique alignment with each other, means for operating one of said sections in advance of the other section, spring means interconnecting said sections to urge following movement of the other section after the first named section is operated, and stop means connected to one of said sections and adapted to engage the other of said sections in the event that said spring means fails to cause the other section to follow the movement of the said first section.

10. A gate valve of the form described comprising a body member, a gate member composed of a plurality of sections having abutting surfaces in oblique alignment to each other, a screw member, a nut member mounted on said screw member, a lever member pivotally connected to said nut member at substantially the mid-portion of the lever, means connected to one of said sections for engaging the nut member on one side thereof to cause operation thereof in advance of the other section during movement of the gate member in one direction, means connected to the other of said sections for engaging the said nut member on the other side thereof to permit operation of the said other section during movement of the gate member in the other direction, means connected to said other of said sections for engaging the adjacent end of said lever member at a predetermined position in the movement of the gate member, said means having sufficient clearance between the said means and the said other section to permit a limited movement of said adjacent end of the lever member therebetween prior to operation of the said other section, interconnecting means between said sections to cause following movement of one section after the other section is operated, and means positioned for engagement with the opposite end of said lever member to cause operation of the lever for seating the first-named section in the direction of the smaller end thereof after the said other section has been moved substantially into the seating position thereof.

11. A gate valve of the kind described comprising a body member, a gate member composed of two wedge members in contacting relation in a surface inclined to the direction of movement of the gate member, a screw member, a nut member mounted on said screw member, a lever member pivotally mounted on said nut member, wedge lifting means connected to one of said wedge members adapted to engage said nut on one side thereof, a wedge operating means connected to the other of said wedge members positioned to engage the other side of said nut member, a wedge operating member connected to said last named wedge member adapted to be engaged by one end of said lever member during the movement of the gate member to the open position thereof to cause wedging action by the said last named wedge member in the seating movement of the wedge member, a stop member adapted to engage said lever member at a predetermined point in the closing movement of the gate valve to cause operation of said lever member to produce accelerating movement of the first-named wedge member to produce wedging action during the final movement thereof, and adjustable stop means adapted to cause rotation of said lever means near the end of the opening movement of the gate valve to cause accelerated movement of the other of said wedge members to produce wedging action on reaching the end position of the said wedge member.

12. A gate valve of the form described having a body member, inlet and outlet openings in said body member, a gate member having two wedge sections mounted for limited movement relative to each other and contacting in a surface inclined to the direction of movement of the gate member, each of said wedge sections having a large end and a small end, the similar ends being on opposite faces of the two wedge sections, said wedge sections having openings therein adapted to register with said inlet and outlet openings in the open position of the valve, wedge lifting means connected to one of said wedge sections, means for engaging the said lifting means for applying initial force to said one wedge section only to cause operation of the same in advance of the other wedge section in movement of the gate member away from the closed position of the valve, means connected to the other wedge section for applying initial force to said other wedge section only in advance of said one wedge section in initiating the closing movement of the valve, lever means associated with said engaging means and stop means for engaging said lever means to cause acceleration of the movement of the following wedge section relative to the movement of the leading wedge section to provide a wedging action of said sections during the final opening or closing movement of the gate valve.

GEORGE G. HARRINGTON.